(12) United States Patent
Aubert Guyon

(10) Patent No.: US 12,027,859 B2
(45) Date of Patent: Jul. 2, 2024

(54) METHODS AND SYSTEMS FOR POWER MANAGEMENT IN A MICROGRID

(71) Applicant: Schneider Electric Industries SAS, Rueil-Malmaison (FR)

(72) Inventor: Caroline Aubert Guyon, La Buisse (FR)

(73) Assignee: Schneider Electric Industries SAS, Rueil-Malmaison (FR)

(*) Notice: Subject to any disclaimer, the term of this patent is extended or adjusted under 35 U.S.C. 154(b) by 138 days.

(21) Appl. No.: 17/764,405

(22) PCT Filed: Oct. 2, 2020

(86) PCT No.: PCT/EP2020/077719
§ 371 (c)(1),
(2) Date: Mar. 28, 2022

(87) PCT Pub. No.: WO2021/064206
PCT Pub. Date: Apr. 8, 2021

(65) Prior Publication Data
US 2022/0302703 A1 Sep. 22, 2022

Related U.S. Application Data

(60) Provisional application No. 62/909,304, filed on Oct. 2, 2019.

(51) Int. Cl.
H02J 7/00 (2006.01)
H02J 3/00 (2006.01)
H02J 3/32 (2006.01)
H02J 3/38 (2006.01)

(52) U.S. Cl.
CPC .............. *H02J 3/004* (2020.01); *H02J 3/32* (2013.01); *H02J 3/381* (2013.01); *H02J 7/0048* (2020.01); *H02J 2203/10* (2020.01); *H02J 2300/10* (2020.01); *H02J 2300/22* (2020.01); *H02J 2300/40* (2020.01)

(58) Field of Classification Search
CPC .. H02J 3/004; H02J 7/0048; H02J 3/32; H02J 3/381; H02J 2300/40; H02J 2300/10; H02J 2300/22; H02J 2203/10
USPC .......................................................... 307/43
See application file for complete search history.

(56) References Cited

U.S. PATENT DOCUMENTS

| | | | |
|---|---|---|---|
| 9,026,259 B2 * | 5/2015 | Zadeh | H02J 3/003 700/291 |
| 2011/0077792 A1 | 3/2011 | Shimoda et al. | |
| 2016/0329713 A1 * | 11/2016 | Berard | H02J 3/32 |

FOREIGN PATENT DOCUMENTS

| | | |
|---|---|---|
| KR | 20180062795 A | 6/2018 |
| KR | 20180083487 A | 7/2018 |

OTHER PUBLICATIONS

International Search Report and Written Opinion dated Nov. 16, 2020 for corresponding International Application No. PCT/EP2020/077719, 9 pages.

* cited by examiner

*Primary Examiner* — Michael R. Fin
(74) *Attorney, Agent, or Firm* — Locke Lord LLP

(57) ABSTRACT

A method for power management in a microgrid, the microgrid including at least one renewable energy source, at least one non-renewable energy source and at least one grid-forming energy storage source.

12 Claims, 6 Drawing Sheets

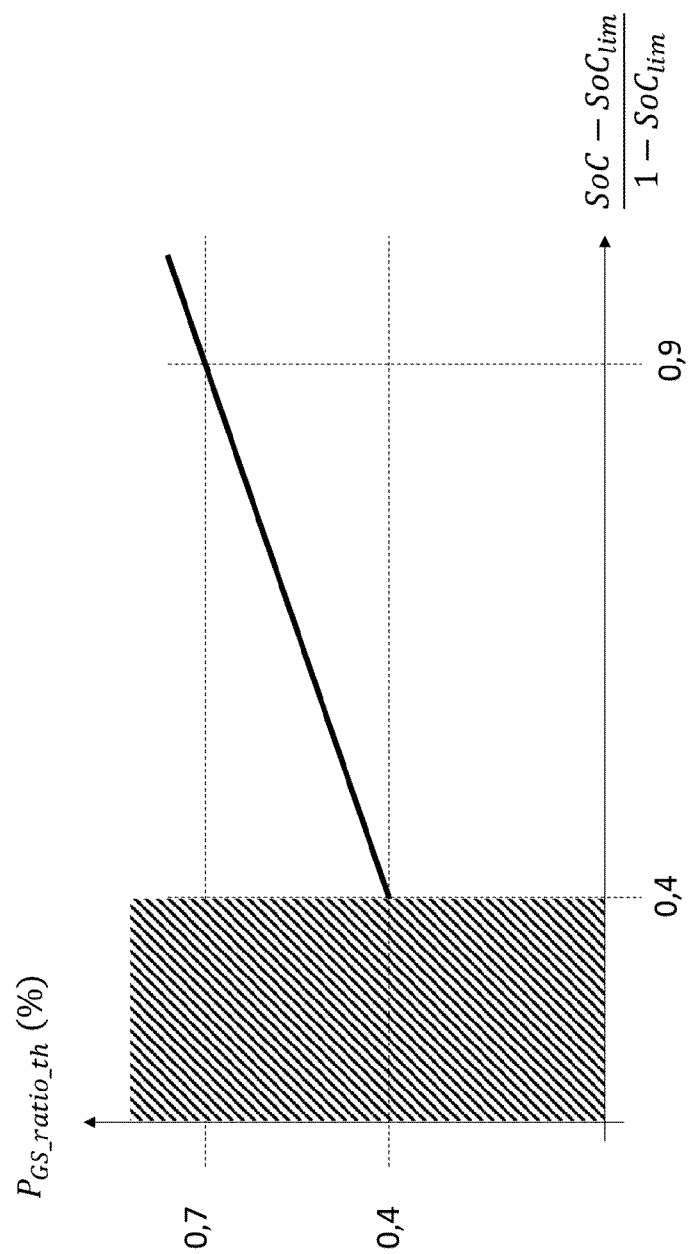

METHODS AND SYSTEMS FOR POWER MANAGEMENT IN A MICROGRID

The present application claims priority from U.S. Provisional Patent Application No. 62/909,304 filed on Oct. 2, 2019. The entire content of this priority application is hereby incorporated by reference.

TECHNICAL FIELD

The present disclosure relates to microgrids. More particularly, aspects of the present disclosure relate to a system and method for power management in a microgrid.

BACKGROUND ART

A microgrid can be a small local grid, which can include various energy sources. For example, a microgrid can include a wind generator, a solar generator, a diesel generator, and other power generators. The microgrid can also include loads. For example, the microgrid can include a building, a data center, a harbor, an industrial site, a campus, or even a small town. The microgrid can also be connected to a larger grid, such as a power utility. The utility can provide power to the microgrid, for example, to provide additional power to the loads and/or to improve reliability.

In some embodiments, a microgrid controller contains algorithms to manage the microgrid operations, and to share power to be produced between the different energy sources of different natures.

One of the main goals of the microgrid controller can be to minimize usage of diesel generators and to maximize usage of renewable energy sources, in particular for financial and/or environmental reasons. However, as renewable power can vary rapidly and as a load change can happen, the microgrid controller has to ensure that the such minimal usage of diesel generators does not lead to a risk of instability or at least malfunctioning of the microgrid.

For instance, if the microgrid power capacity is too low, instability can lead the solar generators to be disconnected, and to be reconnected only after some time (e.g. some minutes). During this time, solar energy cannot be provided to the microgrid. Besides, another risk is blackout; because of reverse power or important load change, the energy sources could be unable to maintain a grid-forming network. A blackout can be significantly harmful, with at least financial impacts and sometimes other risks if critical loads cannot be supplied with energy in time.

It is an object of the invention to alleviate these challenges of microgrid stability, in particular while minimizing usage of non-renewable energy sources.

SUMMARY OF THE DISCLOSURE

This summary is provided to introduce concepts related to the present inventive subject matter. This summary is not intended to identify essential features of the claimed subject matter nor is it intended for use in determining or limiting the scope of the claimed subject matter.

In one aspect, the invention relates to a method for power management in a microgrid, the microgrid comprising at least at least one renewable energy source, at least one non-renewable energy source and at least one grid-forming energy storage source, the method comprising the steps of:
 calculating a power capacity of the grid-forming energy sources to ensure stability of the microgrid;
 calculating a state of charge lower limit of the grid-forming energy storage source; and
 determining if a power capacity of the non-renewable energy source is to be modified based on the state of charge lower limit and on the grid-forming energy source power capacity previously calculated.

This method allows to manage the microgrid in a more efficient way, with the power capacity of the non-renewable energy source being limited while optimizing power output of the renewable energy sources. Microgrid stability is more particularly obtained thanks to an optimization of an energy reserve from the storage energy sources.

According to another aspect, the invention relates to a microgrid comprising a microgrid controller adapted to implement the method.

Particular embodiments of the invention are set forth in the dependent claims.

These and other aspects and embodiments are discussed in detail below. The foregoing information and the following detailed description include illustrative examples of various aspects and embodiments, and provide an overview or framework for understanding the nature and character of the claimed aspects and embodiments. The drawings provide illustration and a further understanding of the various aspects and embodiments, and are incorporated in and constitute a part of this specification. The drawings, together with the remainder of the specification, serve to describe and explain the claimed aspects and embodiments.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 6 is a graph illustrating the method for determining when to reduce power capacity from the non-renewable energy sources.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

The terms "including", "comprising", "containing", "involving" and variations thereof herein, is meant to encompass the items listed thereafter, equivalents thereof, and additional items, as well as alternate embodiments consisting of the items listed thereafter exclusively.

Figure 1:
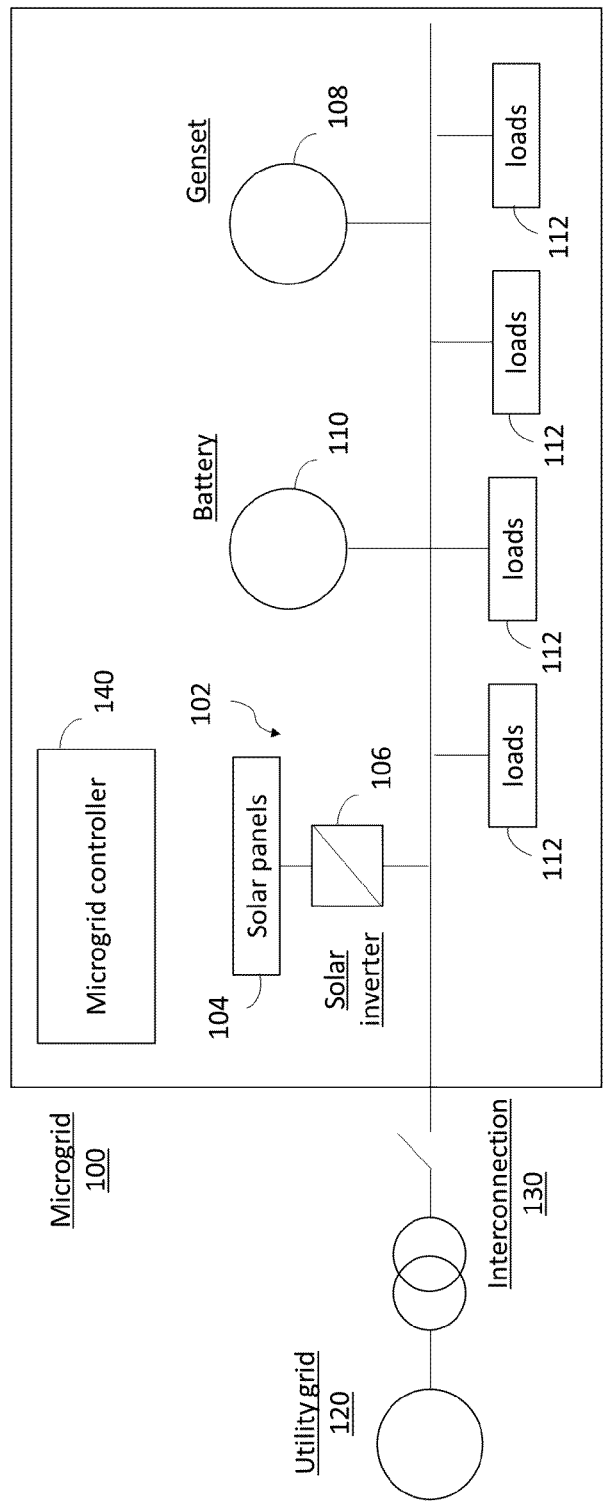
FIG. 1 is a block diagram illustrating a microgrid system in accordance with an embodiment.

Referring to [FIG. 1], a microgrid 100 includes multiple distributed energy sources DERs adapted to output or store electric power. In order to be electrically connected together, advantageously in parallel, to the microgrid 100, the DERs must each be capable of delivering an electrical signal of the same frequency and the same voltage.

The DERs can include one or several renewable energy sources 102, such as a solar generator, which generally generate an electrical signal (an electric frequency and a voltage). The solar generator can include solar panels 104 coupled to a solar inverter 106. There may be an inverter for each renewable energy source or for multiple renewable energy sources. Regardless of the chosen configuration, the one or more inverters 106 are capable of converting a DC electrical signal from the solar panels to an AC electrical signal before it is injected into the microgrid 100.

The inverters of the renewable energy sources 102 may be, when coupled to an energy storage source (ESS), set up as Virtual Synchronous Generator (VSG). As traditional engine powered generators run synchronously providing energy supply with a constant frequency, integrating renewable energy sources to the same microgrid is alleviated by controlling the renewable energy inverters as to emulate characteristics and behavior of traditional synchronous generators.

The energy sources can also include one or several generators 108, hereafter called gensets. Gensets 108 can use fossil fuels such as coal, oil, and natural gas to generate electricity. Gensets generally comprise a synchronous motor (an alternator) that, when rotationally driven by a shaft of a rotating machine, generates an AC electrical signal. The rotating machine may comprise a diesel motor or a turbine such as e.g. a gas, water, steam or air turbine.

The microgrid 100 includes one or several energy storage sources ESS 110, which may be, for example, a battery, or a plurality of batteries electrically connected to each other. If multiple batteries are used, they may be connected in series or in parallel to produce resultant voltages different from the voltage of the individual battery units. Embodiments of ESS may be, for example, nickel-metal-hydride, lithium-ion, lead-acid or other battery types as well known in the art. According to an embodiment, ESS 110 may be coupled to renewable sources 102, in particular for VSGs. In an embodiment, similarly as for renewable energy sources 102, one or more inverters (not illustrated in [FIG. 1]) may be capable of converting a DC electrical signal from the ESS 110 to an AC electrical signal before it is injected into the microgrid 100.

ESS can be defined by a state of charge SoC, which is the level of charge of the ESS relative to its full capacity. The units of SoC are percentage points (0%=empty; 100%=full).

Each DER of the microgrid 100 can either be of the grid-tie or grid-forming type.

Grid-tie DERs are adapted to match the electrical signal of the microgrid and provide power at any instant. Grid-tie DERs thus need to be connected to a voltage source to output power. Grid-tie DERs are also designed to quickly disconnect from the grid if the utility grid goes down or if the electrical signal goes outside acceptable boundaries. This is a requirement that ensures that in the event of a blackout, the grid-tie DERs shut down to prevent the energy they transfer from harming any line workers who are sent to fix the power grid. Among grid-tie DERs, it can be differentiated between grid-feeding DERs, that impose their output power to the connected grid whatever the grid electrical signal (frequency and amplitude), and grid-supporting DERs that adjust their output (active and/or reactive) power to support the microgrid.

In the following disclosure, unless indicated otherwise, it is considered that renewable energy sources 102, such as solar generators, are grid-tie.

Grid-forming DERs operate as grid-following sources that track the electrical signal of the microgrid to control their output. Grid-forming DERs control their frequency output, making it possible for them to naturally support the microgrid frequency while sharing a portion of the load change.

In the following disclosure, unless indicated otherwise, it is considered that gensets 108 are grid-forming. ESS can either be grid-forming or grid-tie.

The microgrid can also include one or more loads 112 that are supplied in energy by the DERs.

The microgrid 100 can operate in an island mode because of economic issues or geographical position. An "off-grid" microgrid can be built in areas that are far distant from any transmission and distribution infrastructure and, therefore, have no connection to the utility grid.

Additionally or alternatively, additional loads can be coupled to the microgrid 100 to receive power from the microgrid 100. An "on-grid" microgrid 100 is connected to a utility grid 120, including a power utility. The microgrid 100 can be connected to the utility grid 120 via an interconnection 130. The interconnection 130 can be a circuit breaker or other any other switch.

In the following disclosure, unless indicated otherwise, it is considered that the microgrid 100 is "off-grid", i.e. disconnected from the utility grid 120. However, this is non-limiting and the disclosure may also be used for "on-grid" applications.

In an "off-grid" mode, although such microgrids are traditionally designed to be energy self-sufficient, intermittent renewable energy sources 102 and their unexpected and sharp variations can cause unexpected power shortfall or excessive generation in the microgrid 100. This will immediately cause instability, with unacceptable voltage or frequency deviation in the microgrid 100.

To mitigate such risks, the microgrid includes a microgrid controller 140. Among other functions, the microgrid controller is adapted to stabilize the electrical signal of the microgrid (voltage and frequency) between DERs and loads 112.

The microgrid controller 140 is also adapted to determine when the interconnection 130 should be opened and closed to transition between the "off-grid" mode, in which the microgrid 100 is electrically isolated from the power utility 120, and the "on-grid" mode, in which the microgrid is electrically connected to the utility grid 120.

The microgrid controller 140 is also adapted to reduce power generated by the gensets 108, prioritizing the renewable energy sources 102, such as the solar panels, as preferred sources of power.

Although not illustrated in [FIG. 1], the microgrid controller 140 can be adapted to control the microgrid 100 by measuring currents and voltages to the loads 112 of the microgrid 100. The grid controller 140 can be coupled to lines to each of the loads 112 to measure the load currents.

In the "on-grid mode", the grid controller 140 can also be coupled to an output line of the utility grid 120, between the utility 120 and the interconnection 130 as well as an input line of the microgrid 100 between the interconnection 130 and the microgrid 100 to measure the voltages of the utility grid 120 and the microgrid 100, respectively. The microgrid controller 120 can also be coupled to the interconnection 130 to provide commands to the interconnection 130 for opening and closing.

The microgrid controller 140 can also be coupled to each of the DERs 102, 110, 108 to receive measurements and provide commands such as output power references. These measurements can be used to determine the output power, capacity or reserve of a DER or of a DER type.

An embodiment comprises a microgrid controller 140 under the form of an apparatus comprising one or more processor(s), I/O interface(s), and a memory coupled to the processor(s). The processor(s) may be implemented as one or more microprocessors, microcomputers, microcontrollers, digital signal processors, central processing units, state machines, logic circuitries, and/or any devices that manipulate signals based on operational instructions. The processor(s) can be a single processing unit or a number of units, all of which could also include multiple computing units. Among other capabilities, the processor(s) are configured to fetch and execute computer-readable instructions stored in the memory. The microgrid controller 140 may execute one or more programs or modules to perform the aforesaid functions.

The microgrid controller 140 may contain or execute other programs, such as to send control commands, transfer data, to associate data from the various components together (preferably in a suitable data structure), to perform calculations using the data, to otherwise manipulate the data, and to present results to a user (e.g. through a graphical user interface) or another processor.

In an embodiment, each DER, or each type of DER, has also a controller for controlling operation of the respective DER based on the command transmitted by the microgrid controller 140.

Figure 2:
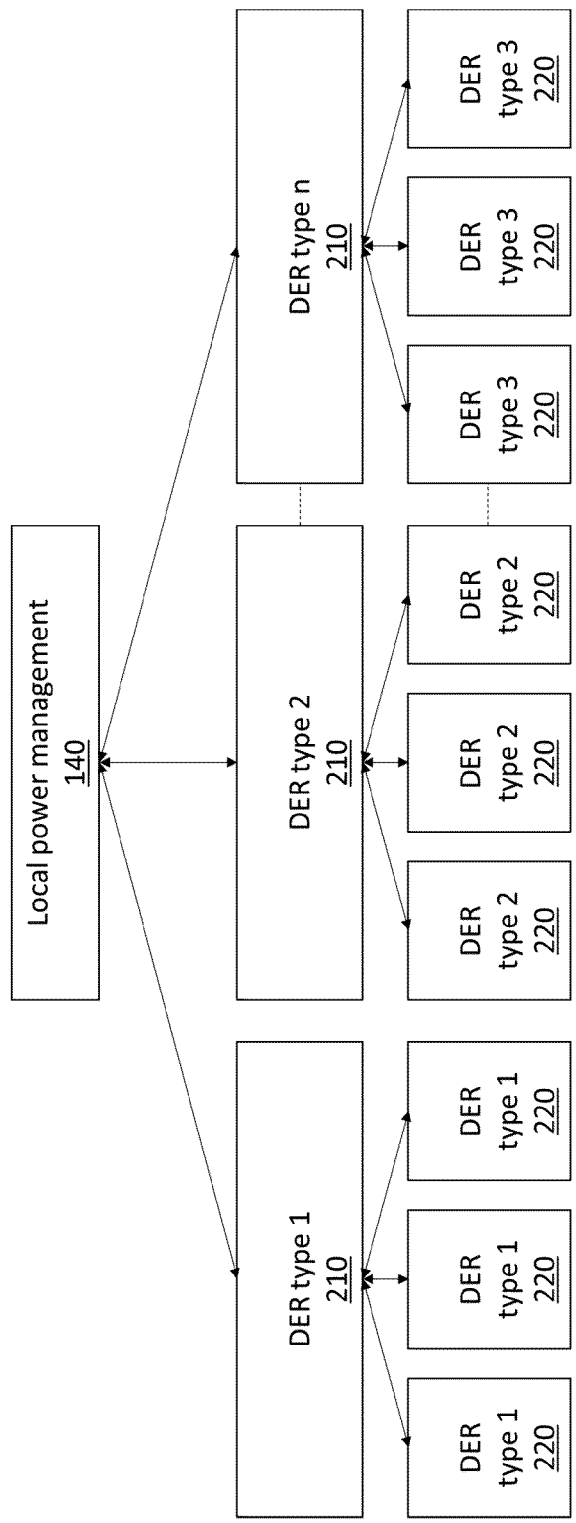
FIG. 2 is a block diagram illustrating a power management system of a microgrid in accordance with an embodiment.

Referring to the embodiment of [FIG. 2], DERs can be divided into parts, each part advantageously encompassing a DER type and including a part controller 210.

The part controller 210 is adapted to manage reserve and power sharing in this part of the microgrid 100 and in particular to give power setpoints to each DER included in this part.

In an embodiment, the part controller 210 can command local controllers 220 located at the level of each DER. The local controller 120 controls the starting and stopping (turning on or off) of a DER, and in particular of the genset 108 and storage unit 110, in order to match the power to be supplied to the power demanded by the load 112 and the power supplied by the renewable energy sources 102. In the following, "turning on or off" should thus be construed as starting or stopping the energy generation from one DER of the microgrid.

As renewable power varies a lot, the microgrid controller 140 has to react fast enough and manage all energy sources that are available. In the "off-grid" mode, one of the main challenge is to minimize usage of gensets while ensuring enough power capacity requested by the microgrid to ensure stability.

By "capacity of a DER", it is understood the maximum output the DER can physically produce at a given instant t.

By "capacity requested by the microgrid", it is understood the necessary total DER power capacity to avoid microgrid unbalance or instability at a given instant t.

In the following, the disclosure focuses more precisely on the grid-forming power capacity. Grid-forming power capacity is more particularly relevant when dealing with microgrid stability as grid-forming DERs can easily adapt their power output to support the microgrid. Such grid-forming power capacity is generally obtained from gensets and grid-forming ESS. Grid-forming ESS are defined by a state of charge which is likely to vary upon charge or discharge. Genset power capacity and/or output power can be increased by turning on or adding one or several gensets to the microgrid, and can be reduced by turning off or stopping one or several gensets from the microgrid.

The disclosure aims more precisely at determining a lower limit for the grid-forming ESS state of charge $SoC_{lim}$. However, although the disclosure focuses on this particular aspect, other criteria may be considered to optimize the microgrid operation that are not described below in more details, for instance to limit the risks of premature aging or damages. The calculation of the state of charge lower limit $SoC_{lim}$ will be described below in more details.

Figure 3:
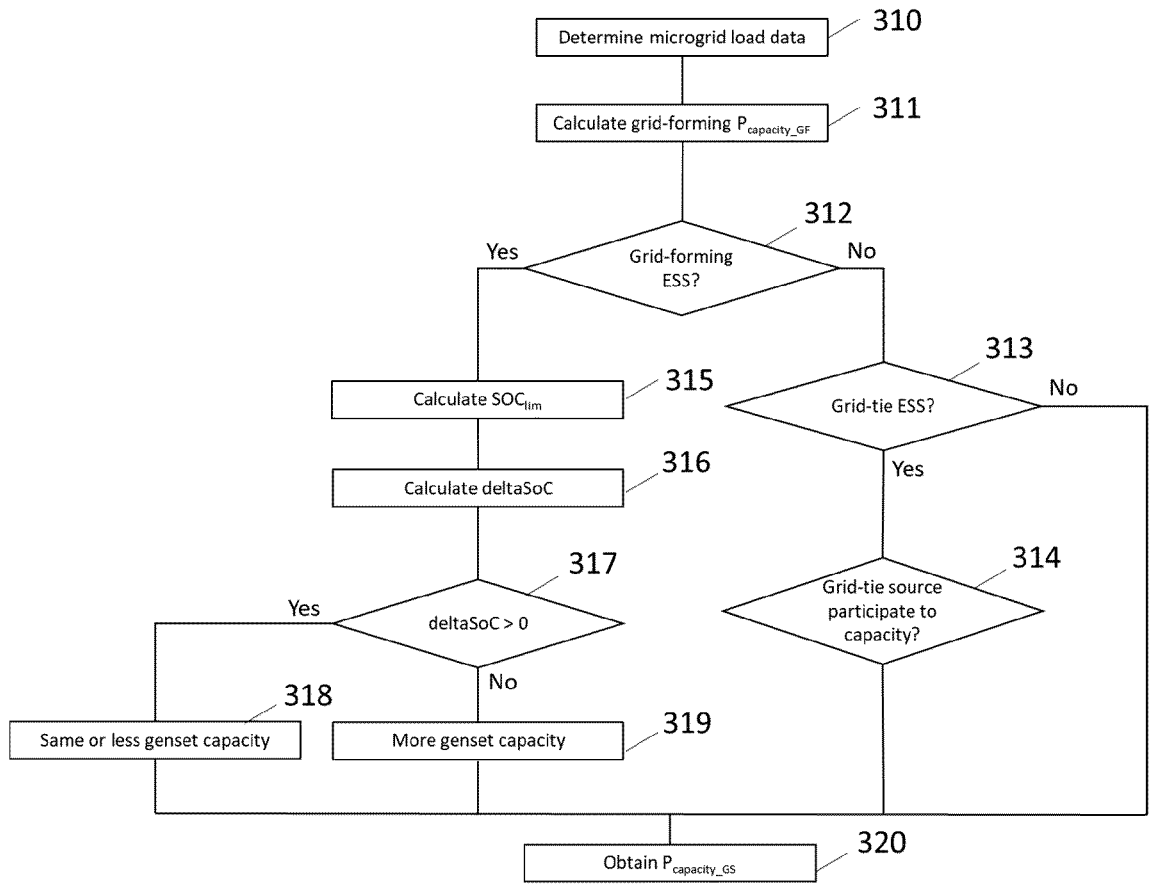
FIG. 3 is a flow chart illustrating a method for calculating the power capacity requested from the non-renewable energy source.

FIG. 3 is a process flow diagram illustrating a method for calculating the genset power capacity requested by the microgrid 100. This method can be performed at any moment during operation of the microgrid 100. However, in an embodiment, this method is performed periodically during operation of the microgrid 100, for instance every 100 milliseconds, every second or every minute.

The terms "power output", "power capacity", "power reserve" and variations thereof herein, should be understood here below as defining the properties of a DER or a DER type at a given moment when the method is performed. These terms can be measured in amperage (Watts=Volts× Amps).

The process starts at step 310 where the microgrid controller 140 of [FIG. 1] receives, and more particularly determines or calculates, microgrid load and DER data. Microgrid data may include data from DER and loads connected to the microgrid controller 140.

In step 311, from the microgrid data, the grid-forming power capacity requested by the microgrid 100 is calculated, that is necessary to maintain stability, to cope with load change or any other disruption to the supply in the microgrid 100.

According to an embodiment, the grid-forming power capacity which is requested is thus equal to the power to match the load power at an instant t to which is added a spinning reserve, which is the extra capacity that is available by increasing the power output of grid-forming DERs that are already connected to the microgrid 100.

The grid-forming capacity can thus be calculated according to the following equation:

$$P_{capacity\_GF} = d_{Pmax} \times P_{load}$$

Wherein $P_{capacity\_GF}$ is the total grid-forming power capacity, $d_{Pmax}$ is a coefficient superior to 100%, and $P_{load}$ is the load power at the instant t. $d_{Pmax}$ is for instance chosen equal to 125%, meaning that a load impact up to 25% of the current load can still be supplied by the grid-forming DERs at the instant t. However, $d_{Pmax}$ can have other values that may be specific to each microgrid, for instance superior or equal to 110%, 120% or 130%. Besides, $d_{Pmax}$ may vary over time depending on the load in the microgrid.

Such calculation means that at the instant t, a load increase can occur while the microgrid still being able to provide enough power output thanks to the grid-forming DERs, in particular gensets and ESS. $P_{Capacity\_GF}$ calculation above is non-limiting and any other calculation could be used, not only based on the load power of the microgrid.

In step 312, it is determined if there is one or several grid-forming ESS in the microgrid 100. If no, it means that grid-forming ESS cannot be taken into account in the genset power capacity calculation.

The method then goes to step 313 to determine if there is one or several grid-tie ESS in the microgrid 100. If no, it means that no ESS, either grid-forming or grid-tie, can provide energy reserve to the microgrid. The power capacity requested by the microgrid is thus set to be equal to the genset power capacity alone so that, at step 320, $P_{capacity\_GS} = P_{capacity\_GF}$.

Going back to step 313, if grid-tie ESS is available and if the grid-tie ESS can be available for a given period of time (step 314), grid-tie ESS can be taken into account to reduce the power capacity requested by the gensets as they may contribute to the grid-forming capacity requested by the microgrid 100.

Going back to step 312, if grid-forming ESS is available, the method moves to step 315 to calculate the state of charge lower limit $SoC_{lim}$, which is the minimal level of charge that the grid-forming ESS should have to ensure microgrid stability. Based on this state of charge lower limit $SoC_{lim}$, the method allows to decide if gensets need to be turned on to increase genset capacity, or in the opposite, if gensets can be turned off while maintaining sufficient stability of the microgrid 100.

In step 315 of [FIG. 3], the state of charge lower limit $SoC_{lim}$ is calculated. [FIG. 4] is a diagram illustrating in more details the specific steps to calculate this state of charge lower limit $SoC_{lim}$, and it will be now described below in more details.

The state of charge lower limit $SoC_{lim}$ corresponds to a minimal threshold to ensure that the grid-forming ESS power capacity of the microgrid is sufficient during operation. State of charge SoC of the grid-forming ESS should not be less than this minimal threshold, in which case microgrid stability may not be guaranteed.

More particularly, the state of charge lower limit $SoC_{lim}$ is important to avoid risks due to intermittency of renewable energy sources. For instance, if clouds appear in the sky and solar generators cannot output power any longer, then ESS must cope with this situation by having enough reserve to output additional power, to compensate for the energy power was previously provided by the solar generators to the microgrid.

Figure 4:
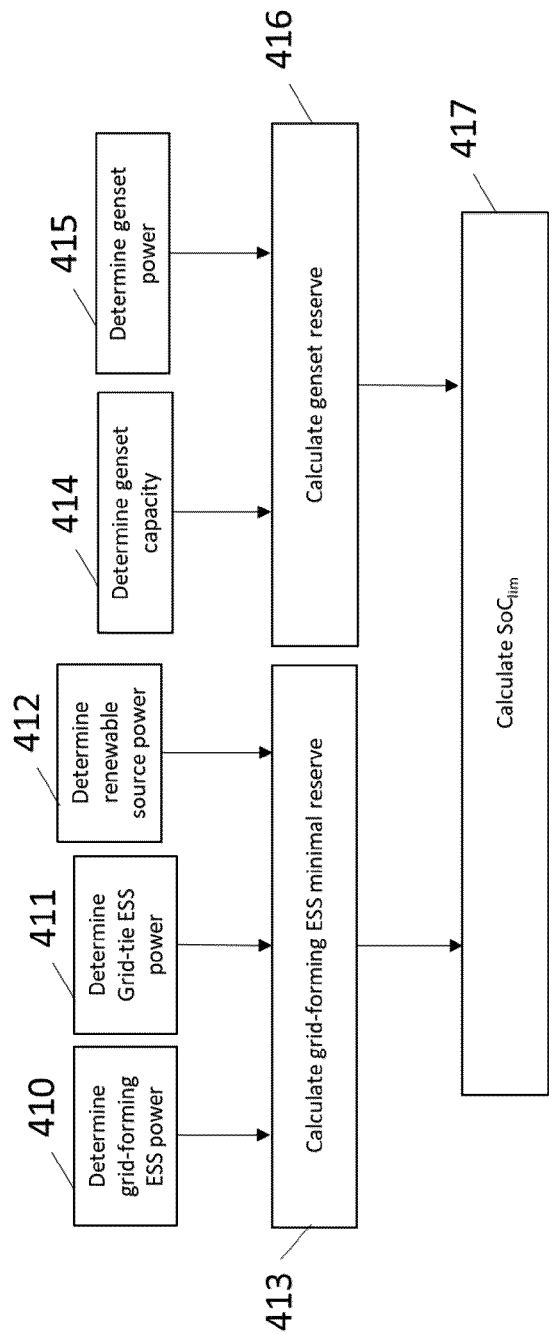
FIG. 4 is a flow chart illustrating a method for calculating a state of charge lower limit of the grid-forming energy storage sources.

Also, in the method of [FIG. 4], it is necessary to determine what should be the state of charge lower limit $SoC_{lim}$ to make sure that, even if the grid-tie renewable sources stop outputting power, there will still be enough power that can be generated from the grid-forming ESS.

A first step 410 is thus to determine the power outputted by the grid-forming ESS. Another step 411 is to determine the power outputted by the grid-tie ESS. Another step 412 is to determine the power outputted by the grid-tie renewable sources.

Based on these first steps 410, 411, 412, it is possible to calculate a minimal ESS reserve, independently from genset power capacity, that is required according to the following equation (step 413):

$$\text{ESS minimal reserve} = (P_{GF_{ESS}} \pm P_{GT_{ESS}} - P_{renewable_{source}}) \times d_{Pmax}$$

Wherein $d_{Pmax}$ is the coefficient of step 311 to take into account load variations, and $P_{GF\_ESS}$, $P_{GT\_ESS}$ and $P_{renewable\_source}$ are respectively the power of the grid-forming ESS, the grid-tie ESS and the renewable sources of the microgrid calculated in steps 410, 411 and 412. The power of these respective DERs is multiplied by $d_{Pmax}$ to make sure that this minimal reserve, even if sufficient at an instant t, will also be adequate in case of load change or any other disruption to the supply in the microgrid.

It will be noted that grid-tie ESS can either contribute positively or negatively to the ESS minimal reserve. Grid-tie ESS contribution can be positive if it can output power during a sufficient period of time. To the opposite, grid-tie ESS contribution can be negative if it proves unable to provide power, in which case grid-forming ESS needs to compensate for this loss of power.

In parallel to the calculation of the ESS minimal reserve, a genset reserve can also be calculated (step 416). The genset reserve is equal to the genset power capacity (step 414) to which is subtracted the power outputted by the gensets (step 415):

$$\text{Genset reserve} = P_{capacity\_GS} - P_{GS}$$

Wherein $P_{capacity\_GS}$ is the genset power capacity and $P_{GS}$ is the power output. Finally the state of charge lower limit $SoC_{lim}$ is calculated (step 417) by subtracting the genset reserve to the ESS minimal reserve, and by converting in an energy reserve obtained for a given period of time $\Delta t$ (measured in kilowatt-hour for instance):

$$SoC_{lim} = (\text{ESS minimal reserve} - \text{Genset reserve}) \times \Delta t$$

After having calculated the state of charge lower limit $SoC_{lim}$, referring back to [FIG. 3], in step 316, the method calculates a difference deltaSoC between the state of charge SoC and the state of charge lower limit $SoC_{lim}$ of the grid-forming ESS:

$$\text{deltaSoC} = SoC - SoC_{lim}$$

Based on the value of deltaSoC previously calculated in step 316, step 317 determines if:
the same genset power capacity or a lesser genset capacity should be made available in the microgrid (step 317); or
more genset power capacity should be made available in the microgrid (step 318).

Varying the genset power capacity of the microgrid can be implemented by turning on or off on or several gensets. By "turning off", it should thus be understood that a genset can be switched off and/or disconnected from the microgrid. To the opposite, "turning on" should be understood that a genset can be switched on and/or connected to the microgrid to generate power.

More particularly, in step 317 to [FIG. 3], the genset power capacity to be turned off is calculated while maintaining the state of charge of the grid-forming ESS above the state of charge lower limit $SoC_{lim}$.

However, at this step 317, it is necessary to make sure that turning off a genset will not create instability of the microgrid since the ESS reserve could then be depleted too quickly. In such a case, the ESS reserve may rapidly become insufficient.

Figure 5:
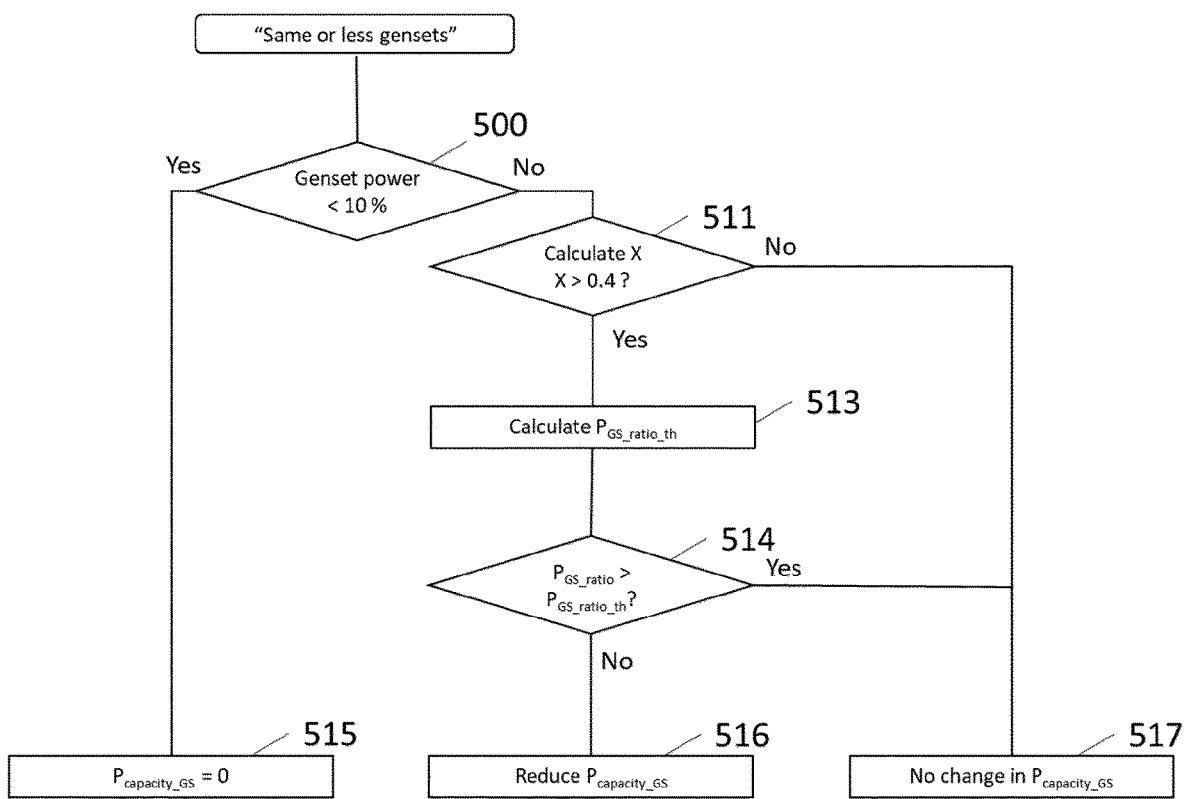
FIG. 5 is a flow chart illustrating a method for determining when to reduce power capacity from the non-renewable energy sources to be connected to the microgrid.

Also, [FIG. 5] is a process flow diagram illustrating a method specifically for determining in which specific conditions genset power capacity should be reduced in the microgrid.

In a first step 500, it is evaluated if the power outputted by the gensets is less than a given threshold, for instance equal to 10% in the embodiment of [FIG. 5]. If it is the case, the genset capacity is set at zero (step 515), meaning that all gensets can be turned off as it is inefficient to keep them operating.

If no, in step 511, a parameter X is calculated. This parameter X correspond to a trade-off to be found between the value of deltaSoC ($SoC-SoC_{lim}$) and the value of the state of charge lower limit $SoC_{lim}$. For instance, it means that when the grid-forming ESS reserve is high or when the state of charge lower limit $SoC_{lim}$ is high, genset power capacity is likely to be reduced. According to an embodiment, this parameter X is calculated according to the following equation:

$$X = \frac{SoC - SoC_{lim}}{1 - SoC_{lim}}$$

This parameter X is compared to a given threshold, equal to 0.4 in the embodiment of [FIG. 6]. Below this threshold (corresponding to the hatched area of [FIG. 6]), it is considered that genset power capacity should not be reduced as the ESS reserve may not be sufficient to ensure stability of the microgrid during a sufficient period of time, and because the ESS reserve may be depleted too quickly with the risk of requiring turning on a genset in a too near future.

From this equation, a relationship, such as a linear function shown in the embodiment of [FIG. 6], can be obtained to link a theoretical genset power ratio $P_{GS\_ratio\_th}$ and the parameter X previously calculated.

$$P_{GS\_ratio\_th}(\%) = A \times X + B$$

Wherein A and B are constant values that are specific to each microgrid arrangement, and that may depend on its topology, the types of DERs, the number of DERs etc. $P_{GS\_ratio\_th}$ is a theoretical value representing a ratio between the genset power output relative and the genset power capacity.

Also, in step 512, this relationship is used to determine the theoretical genset power ratio $P_{GS\_ratio\_th}$ for a given X value.

In step 513, the genset power ratio $P_{GS\_ratio}$ is determined, which current genset power ratio at the instant t, and that can be calculated according to the following equation:

$$P_{GS\_ratio} = \frac{P_{GS}}{P_{capacity\_GS}}$$

The genset power ratio $P_{GS\_ratio}$ is compared with the theoretical genset power ratio $P_{GS\_ratio\_th}$ previously determined.

If the genset power ratio $P_{GS\_ratio}$ is more than this theoretical value $P_{GS\_ratio\_th}$, then it means that the genset capacity should not be reduced (step 517).

If the genset power ratio $P_{GS\_ratio}$ is less than this theoretical value $P_{GS\_ratio\_th}$, genset capacity may be reduced to a lower power capacity $P_{capacity\_GS\_min}$, that can be calculated according to the following equation:

$$P_{capacity\_GS\_min} = \frac{P_{GS}}{P_{GS\_ratio\_th}}$$

Wherein $P_{GS}$ is the power output of the genset at the instant t and $P_{GS\_ratio\_th}$ is theoretical genset power ratio previously determined.

Returning to step 320 of the method illustrated of [FIG. 3], the genset power capacity $P_{capacity\_GS}$ can finally be modified (increased or reduced) or can remain unchanged, in particular based on the outcome of step 513.

In particular, the new genset power capacity $P_{capacity\_GS\_min}$ can be compared with the grid-forming power capacity $P_{capacity\_GF}$ calculated at step 311 to make sure that the lower power capacity $P_{capacity\_GS\_min}$ and the grid-forming ESS capacity $P_{capacity\_ESS}$ are, when added, still sufficient to match the grid-forming power capacity $P_{capacity\_GF}$ requested by the microgrid, so that:

$$P_{capacity\_GS\_min} + P_{capacity\_ESS} \geq P_{capacity\_GF}$$

Only then, genset power capacity can be reduced to obtain $P_{capacity\_GS} = P_{capacity\_GS\_min}$.

Thanks to this method, it is possible to have a precise and dynamic control of the DER capacity and output of each DER or DER type in the microgrid, by minimizing the usage of gensets and limiting the grid-forming ESS reserve.

The steps of a method described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, or any other form of storage medium known in the art. An exemplary storage medium may be coupled to the processor such the processor can read information from, and write information to, the storage medium. In the alternative, the storage medium may be integral to the processor.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments.

The invention claimed is:

1. A method for power management in a microgrid, the microgrid comprising grid-forming energy sources comprising at least one renewable energy source, at least one non-renewable energy source and at least one grid-forming energy storage source, the method comprising:
    calculating a power capacity of the grid-forming energy sources to ensure stability of the microgrid;
    calculating a state of charge lower limit of the grid-forming energy storage source; and
    determining if a power capacity of the non-renewable energy source is to be modified based on the state of charge lower limit and on the power capacity of the grid-forming energy sources, wherein said determining further comprises:
    calculating a difference between a state of charge and the state of charge lower limit of the grid-forming energy storage source; and
    increasing or reducing the power capacity of the non-renewable energy source depending on the value of the calculated difference.

2. The method according to claim 1, wherein calculating the power capacity of the grid-forming energy sources further comprises:
    determining a load power in the microgrid; and
    obtaining the power capacity of the grid-forming energy sources by multiplying the load power previously determined with a coefficient superior to 100% to take into account a load change.

3. The method according to claim 1, wherein calculating the state of charge lower limit of the grid-forming energy storage source further comprises:
    calculating a grid-forming energy storage source minimal reserve sufficient adapted to provide enough power to the microgrid to maintain stability if the renewable energy source becomes unavailable;
    calculating a non-renewable energy source reserve; and
    obtaining the state of charge lower limit by subtracting the non-renewable energy source reserve to the grid-forming energy storage source minimal reserve.

4. The method according to claim 1, wherein reducing the power capacity of the non-renewable energy source further comprises:
    calculating a parameter X according to the following equation:

$$X = \frac{SoC - SoC_{lim}}{1 - SoC_{lim}};$$

and
    reducing the power capacity of non-renewable energy source based on the value of the parameter X previously calculated.

5. The method according to claim 4, wherein reducing the power capacity of the non-renewable energy source further comprises:
    calculating a theoretical ratio according to the following equation:

$P_{GS\_ratio\_th}$ (%)=$A \times X + B$, wherein A and B are constant values;

determining a power ratio between the power output of the non-renewable energy source and the power capacity of the non-renewable energy source according to the following equation:

$$P_{GS\_ratio}(\%) = \frac{P_{GS}}{P_{capacity\_GS}};$$

and
    reducing the power capacity of non-renewable energy source when the power ratio is inferior to the theoretical ratio.

6. The method according to claim 5, wherein reducing the power capacity of non-renewable energy source further comprises:
    determining a lower power capacity calculated according to the following equation:

$$P_{capacity\_GS\_min} = \frac{P_{GS}}{P_{GS\_ratio\_th}};$$

and
    setting the power capacity of the non-renewable energy source at the lower power capacity if:

$P_{capacity\_GS\_min} + P_{capacity\_ESS} \geq P_{capacity\_GF}$; wherein $P_{capacity\_ESS}$ is the power capacity of the grid-forming energy storage source.

7. The method according to claim 1, wherein the non-renewable energy source is a grid-forming diesel generator.

8. The method according to claim 1, wherein the renewable energy source is a grid-tie solar generator.

9. The method according to claim 1, wherein the grid-forming energy storage source is a battery.

10. The method according to claim 1, wherein the microgrid further comprises a grid-tie energy storage source.

11. A computer-readable non-transitory recording medium on which software is stored to implement the method according to claim 1 when the software is executed by a processor.

12. A microgrid comprising grid-forming energy sources comprising at least one renewable energy source, at least one non-renewable energy source and at least one grid-forming energy storage source, the microgrid further comprising a microgrid controller adapted to:
    calculate a power capacity of the grid-forming energy sources to ensure stability of the microgrid;
    calculate a state of charge lower limit of the grid-forming energy storage source; and
    determine if a power capacity of the non-renewable energy source is to be modified based on the state of charge lower limit and on the power capacity of the grid-forming energy sources, comprising:
    calculating a difference between a state of charge and the state of charge lower limit of the grid-forming energy storage source; and
    increasing or reducing the power capacity of the non-renewable energy source depending on the value of the calculated difference.

* * * * *